(12) United States Patent
Kohl et al.

(10) Patent No.: US 8,101,681 B2
(45) Date of Patent: Jan. 24, 2012

(54) PREPOLYMER MIXTURE CONTAINING SILYL GROUPS AND USE THEREOF

(75) Inventors: Matthias Kohl, Weinheim (DE); Manfred Pröbster, Nussloch (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 29 days.

(21) Appl. No.: 12/483,521

(22) Filed: Jun. 12, 2009

(65) Prior Publication Data

US 2009/0306283 A1    Dec. 10, 2009

Related U.S. Application Data

(63) Continuation of application No. PCT/EP2007/057474, filed on Jul. 19, 2007.

(30) Foreign Application Priority Data

Dec. 14, 2006 (DE) .......................... 10 2006 059 473

(51) Int. Cl.
C08L 83/00 (2006.01)

(52) U.S. Cl. ....................................... 524/506; 524/266

(58) Field of Classification Search .................. 524/266, 524/506
See application file for complete search history.

(56) References Cited

U.S. PATENT DOCUMENTS

| | | |
|---|---|---|
| 3,632,557 A | 1/1972 | Brode et al. |
| 3,971,751 A | 7/1976 | Isayama et al. |
| 3,979,344 A | 9/1976 | Bryant et al. |
| 4,222,925 A | 9/1980 | Bryant et al. |
| 4,345,053 A | 8/1982 | Rizk et al. |
| 4,960,844 A | 10/1990 | Singh |
| 5,225,512 A | 7/1993 | Baghdachi et al. |
| 5,262,502 A | 11/1993 | Fujisawa et al. |
| 5,282,998 A | 2/1994 | Horn et al. |
| 5,290,873 A | 3/1994 | Noda et al. |
| 5,525,654 A | 6/1996 | Podola et al. |
| 5,932,757 A | 8/1999 | Standke et al. |
| 5,990,257 A | 11/1999 | Johnston et al. |
| 6,124,387 A | 9/2000 | Wang et al. |
| 6,204,350 B1 * | 3/2001 | Liu et al. .................. 528/23 |
| 6,310,170 B1 | 10/2001 | Johnston et al. |
| 6,545,087 B1 | 4/2003 | Schmalstieg et al. |
| 6,576,082 B2 | 6/2003 | Okamoto et al. |
| 7,001,966 B2 | 2/2006 | Lang et al. |
| 7,026,398 B2 | 4/2006 | Monkiewicz et al. |
| 7,057,001 B2 | 6/2006 | Bachon et al. |
| 7,332,541 B2 | 2/2008 | Schindler et al. |
| 7,485,353 B2 | 2/2009 | Null |
| 2002/0002263 A1 | 1/2002 | Yako |
| 2004/0071977 A1 | 4/2004 | Shah |
| 2005/0043455 A1 | 2/2005 | Hohner |

FOREIGN PATENT DOCUMENTS

| | | |
|---|---|---|
| EP | 0370464 A2 | 5/1990 |
| EP | 0856450 A1 | 8/1998 |
| EP | 1462500 A1 | 9/2004 |
| EP | 1724321 B1 | 11/2006 |

* cited by examiner

*Primary Examiner* — Peter D Mulcahy

(74) *Attorney, Agent, or Firm* — James E. Piotrowski

(57) ABSTRACT

Monocomponent water-hardening adhesive/sealant compositions comprising mixtures of at least one silane-functional polyoxyalkylene prepolymer and at least one silane-functional polyolefin are described. These compositions may optionally comprise other nonpolar plasticizers, as well as catalysts, fillers, and adhesives. Such adhesive/sealant compositions exhibit outstanding adhesion to plastic substrates and to painted surfaces, whereby the adhesion is maintained even after storage in wet conditions.

6 Claims, No Drawings

PREPOLYMER MIXTURE CONTAINING SILYL GROUPS AND USE THEREOF

This application is a continuation of PCT/EP2007/057474 filed Jul. 19, 2007, which claims the benefit of DE 10 2006 059 473.8, filed Dec. 14, 2006, the complete disclosures of which are hereby incorporated by reference in their entirety.

The present invention relates to compositions comprising a mixture of silane-functional polymers and/or prepolymers and use of same as water-hardening adhesives and sealants.

Water-hardening elastic adhesives and sealants are used in wide areas of industry and the trades. With an increase in substrates to be bonded and with increasing demands of the adhesive joints/seals, there have been increasingly frequent failures of known adhesive/sealant systems. The use of pre-coats (primers) and/or active cleaners as well as other methods of surface pretreatment such as corona treatment, plasma treatment, flame treatment, etc. can remedy the situation. Pretreatment of surfaces before the adhesive/sealing process is an additional working step, which is frequently complex, expensive or not even feasible. In addition to the polyurethane adhesives and sealants having free isocyanate groups and the traditional silicone adhesives and sealants based on dimethylpolysiloxanes, there has recently also been increased use of so-called modified silane adhesives and sealants. With the latter group, the main component of the polymer backbone is a polyether, and the reactive and crosslinkable end groups are alkoxysilyl groups. In comparison with the polyurethane adhesives and sealants, these silane-modified adhesives and sealants have the advantage being free of isocyanate groups, in particular monomeric diisocyanates. They are also characterized by a relatively broad spectrum of adhesion to a variety of substrates without a surface pretreatment by primers.

U.S. Pat. No. 4,222,925 A and U.S. Pat. No. 3,979,344 A describe room temperature-hardenable siloxane-terminated organic sealant compositions based on reaction products of isocyanate-terminated polyurethane prepolymers with 3-aminopropyltrimethoxysilane and/or 2-aminoethyl-methoxysilane or 3-aminopropylmethoxysilane to form isocyanate-free siloxane-terminated prepolymers. However, adhesives and sealants based on these three polymers have unsatisfactory mechanical properties, in particular with respect to their elongation and tensile strength.

Additional synthesis processes and the use of silane-terminated prepolymers in adhesive/sealant applications are described, for example, in the following patents: U.S. Pat. No. 3,971,751 A, EP 70475 A, DE 19849817 A, U.S. Pat. No. 6,124,387 A, U.S. Pat. No. 5,990,257 A, U.S. Pat. No. 4,960, 844 A, U.S. Pat. No. 3,979,344 A, U.S. Pat. No. 3,632,557 A, DE 4029504 A, EP 601021 A or EP 370464A.

WO 02/34838 A1 describes a method for synthesizing compounds having at least one urea group and at least one silyl group in which a compound having at least one amino group is reacted with a carbonate, wherein either the compound having at least one amino group or the carbamate has a silyl group. The compounds synthesized in this way are suitable for producing surface coating agents, sealants, adhesives as well as mounting and insulation foams.

DE 10237271 A1 describes polymer compositions based on alkoxysilane-terminated polymers with a controllable hardening rate. This discloses, among other things, reaction of polypropylene glycols with isocyanates in a first step to form an OH-terminated polyurethane prepolymer and then mixing the latter with isocyanatomethyl-methyldimethoxysilane until no isocyanate band can be seen by IR spectroscopy. The polymer synthesized in this way should then be processed at room temperature with plasticizer, vinyltrimethoxysilane and dried chalk to form a stable paste. After adding 3-(2-aminoethyl)aminopropyltrimethoxysilane as the catalyst, a rapidly hardening polymer composition is obtained. In addition, this document discloses the synthesis of a prepolymer containing isocyanate groups from a polypropylene glycol and a diisocyanate, whereby in a first step, a prepolymer containing isocyanate groups is formed and then is to be mixed with vinyltrimethoxysilane as a reactive diluent and next reacted with N-phenylaminomethyltrimethoxysilane, so that no more isocyanate groups are detectable by IR spectroscopy. The prepolymer mixture prepared in this way should be compoundable with other components.

EP 1158026 A1 describes a hardenable composition comprising 100 parts by weight of a saturated hydrocarbon polymer having at least one group containing silicon and bound by at least one hydroxyl group or hydrolyzable group to the silicon atom, so that this polymer is crosslinkable and forms siloxane bonds. In addition, the composition should contain 1 to 100 parts by weight of a compound having at least one epoxide group on its chain terminus. In addition, this composition contains 1 to 100 parts by weight mica and optionally a paraffinic hydrocarbon oil. Other conventional additives for sealant materials such as antiaging agents and fillers should optionally be mixed into the hardenable composition.

In view of this state of the art, the inventors have formulated the object of providing monocomponent compositions usable as elastic, water-hardening adhesives/sealants or coating agents and have very good adhesion to plastic substrates and painted substrates, even after storage in humidity, without pretreatment of the substrate surface.

The inventive approach to this object can be derived from the patent claims. It comprises essentially providing a monocomponent water-hardening adhesive/sealant composition containing at least one silane-functional polyoxyalkylene prepolymer and at least one silane-functional polyolefin.

In other preferred embodiments, the inventive composition also comprises at least one paraffinic, naphthenic and/or aromatic petroleum oil and/or at least one catalyst plus optionally at least one filler and/or at least one adhesion promoter.

Another subject of the present invention is the use of the adhesive/sealant composition for bonding and/or coating and/or sealing plastic components or painted substrates without pretreatment of these substrates.

In the sense of this invention, "silane-functional polyoxyalkylene prepolymers" are prepolymers based on polyethers. These silane-terminated prepolymers based on polyethers can be synthesized in various ways in principle:

hydroxy-functional polyethers are reacted with unsaturated chlorine compounds, e.g. allyl chloride, in an ether synthesis to form polyethers having terminal olefinic double bonds, which are in turn reacted with hydrosilane compounds having hydrolyzable groups, e.g. HSi (OCH$_3$)$_3$ in a hydrosilylation reaction under the catalytic influence of, for example, transition metal compounds of group 8 to form silane-terminated polyethers.

In another process, the polyethers containing olefinically unsaturated groups are reacted with mercaptosilanes, e.g. 3-mercaptopropyltrialkoxysilane.

In another process, polyethers containing hydroxyl groups are first reacted with di- or polyisocyanates which are then in turn reacted with amino-functional silanes or mercapto-functional silanes to yield silane-terminated prepolymers.

Another possibility involves the reaction of hydroxy-functional polyethers with isocyanato-functional silanes. Silanes having isocyanate groups suitable for this reaction include, for example, methyldimethoxysilylmethyl isocyanate, trimethoxysilylmethyl isocyanate, diethylmethoxysilylmethyl isocyanate, ethyldimethoxysilylmethyl isocyanate, methyldiethoxysilylmethyl isocyanate, triethoxysilylmethyl isocyanate, ethyldiethoxysilylmethyl isocyanate, methyldimethoxysilylethyl isocyanate, trimethoxysilylethyl isocyanate, ethyldimethoxysilylethyl isocyanate, methyldiethoxysilylethyl isocyanate, triethoxysilylethyl isocyanate, ethyldiethoxysilylethyl isocyanate, methyldimethoxysilylpropyl isocyanate, trimethoxysilylpropyl isocyanate, ethyldimethoxysilylpropyl isocyanate, methyldiethoxysilylpropyl isocyanate, triethoxysilylpropyl isocyanate, ethyldiethoxysilylpropyl isocyanate, methyldimethoxysilylbutyl isocyanate, trimethoxysilylbutyl isocyanate, triethylsilylbutyl isocyanate, diethylmethoxysilylbutyl isocyanate, ethyldimethoxysilylbutyl isocyanate, methyldiethoxysilylbutyl isocyanate, triethoxysilylbutyl isocyanate, diethylethoxysilylbutyl isocyanate, ethyldiethoxysilylbutyl isocyanate, methyldimethoxysilylpentyl isocyanate, trimethoxysilylpentyl isocyanate, triethylsilylpentyl isocyanate, ethyldimethoxysilylpentyl isocyanate, methyldiethoxysilylpentyl isocyanate, triethoxysilylpentyl isocyanate, diethylethoxysilylpentyl isocyanate, ethyldiethoxysilylpentyl isocyanate, methyldimethoxysilylhexyl isocyanate, trimethoxysilylhexyl isocyanate, ethyldimethoxysilylhexyl isocyanate, methyldiethoxysilylhexyl isocyanate, triethoxysilylhexyl isocyanate, ethyldiethoxysilylhexyl isocyanate, γ-trimethoxysiloxydimethylsilylpropyl isocyanate, γ-trimethylsiloxy-dimethoxysilylpropyl isocyanate, γ-triethoxysiloxydiethylpropyl isocyanate or γ-triethoxysiloxydiethoxysilylpropyl isocyanate. Instead of methoxysilanes, their ethoxy or propoxy analogs are preferred for occupational hygiene reasons.

Silane-functional poly-α-olefins, silane-functional polyisobutylenes or silane-functional partially crystalline polyolefin waxes may preferably be used as the "silane-functional polyolefin."

Largely amorphous poly-α-olefins include, for example, atactic polypropylene, atactic poly-1-butene, ethene-propene copolymers, ethene-1-butene copolymers, ethene-propene-1-butene copolymers, ethene-propene-1-hexene copolymers, ethene-propene-1-octene terpolymers, ethene-1-butene-1-hexene terpolymers, ethene-1-butene-1-octene terpolymers, ethene-1-hexene-1-octene terpolymers, propene-1-butene-1-hexene terpolymers, propene-1-butene-1-octene terpolymers or propene-1-hexene-1-octene terpolymers. These may be grafted to silane compounds according to the teaching of EP 940493 A1 to which end the silane that is to be grafted preferably has three alkoxy groups attached directly to the silicon. Such silane compounds which are suitable for grafting include, for example, vinyltrimethoxysilane, vinyltriethoxysilane, vinyltris(2-methoxyethoxy)silane, 3-methacryloxypropyltrimethoxysilane, 3-methacryloxypropyltriethoxysilane, vinyldimethylmethoxysilane or vinylmethyldibutoxysilane. In this grafting the silane should usually be used in amounts between 0.1 and 10 wt %, based on the polyolefin.

Production of the silane-functional polyisobutylene and/or silane-functional polybutadienes to be used according to the invention is known in principle; isobutene (isobutylene) monomer and suitable comonomers are typically reacted by ionic polymerization with the help of Lewis acids and are reacted with suitable silanes at the end of the polymerization, essentially forming telechelic silane-functional polyisobutylene homopolymers or copolymers. Production of these polymers, typically having a molecular weight ($M_n$) between 1000 and 50,000, is described in DE 10209404 A1, EP452875A1, EP537660A1, EP1134251A1 and EP856450A1, for example.

Silane-functional partially crystalline polyolefin waxes to be used according to the invention are also known. The polyolefin waxes to be used are preferably synthesized from propylene, ethylene using a metallocene catalyst and optionally additives of a $C_4$-$C_{10}$ 1-olefin and then are functionalized with an alkoxyvinylsilane in a grafting reaction. Such silane-modified partially crystalline polyolefin waxes naturally have the silane functionality distributed randomly along the polymer chain. Silane-modified polyolefin waxes to be used according to the invention are described in EP 1508579 A1, for example.

The inventive adhesive/sealant compositions may also contain apolar plasticizers/extender oils, catalysts, adhesion promoters, fillers, pigments, antiaging agents and/or rheology agents in addition to the two binder components mentioned above.

In particular, aliphatic, aromatic or naphthenic petroleum oils such as those known from WO 2004/009738 A1, for example, are also suitable as apolar plasticizers and/or extender oils. Such suitable extender oils or process oils have a pour point of −30° C. to −50° C., for example, and the kinematic viscosity (DIN 51562) of 5 to 8 mm$^2$/s at 40° C.

Organo-functional silanes such as hydroxy-functional, (meth)acryloxy-functional, mercapto-functional, amino-functional or epoxy-functional silanes are preferably used as the adhesion promoters. Examples of mercapto-functional silanes include 3-mercaptopropyltrimethoxysilane or 3-mercapto-propyltrimethoxysilane or their alkyldimethoxy or alkyldiethoxy analogs. Examples of (meth)acryloxy-functional silanes include 3-acryloxypropyl-trialkoxysilane, 3-methacryloxypropyltrialkoxysilane or their alkyldialkoxy analogs, where the alkoxy groups are preferably methoxy or especially preferably ethoxy groups.

Examples of amino-functional silanes include: 3-aminopropyltrimethoxysilane (AMMO), 3-aminopropyltriethoxysilane (AMEO), 3-aminopropylmethyldimethoxysilane, 3-aminopropylmethyldiethoxysilane, N-(2-amino-ethyl)-3-aminopropyltrimethoxysilane (DAMO), N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, N,N-di(2-aminoethyl)-1-3-aminopropyltrimethoxysilane, N,N-di(2-aminoethyl)-3-aminopropyltriethoxy-silane, N,N-di(2-aminoethyl)-3-aminopropylmethyldimethoxysilane, N,N-di(2-aminoethyl)-3-aminopropylmethyldiethoxysilane, N-(2-aminoethyl)-N'-(2-aminoethyl)-3-aminopropyltrimethoxysilane, N-(2-aminoethyl)-N'-(2-amino-ethyl)-3-aminopropyltriethoxysilane, N-(2-aminoethyl)-N'-(2-aminoethyl)-1-3-aminopropylmethyldimethoxysilane, N-(2-aminoethyl)-N'-(2-aminoethyl)-1-3-aminopropylmethyldiethoxysilane, bis(triethoxysilylpropyl)amine, bis(trimethoxysilylpropyl)amine, N-(2-aminobutyl)-3-aminopropyltriethoxysilane, N-(2-aminobutyl)-3-aminopropyltrimethoxysilane, N—(N-butyl)-3-aminopropyltrimethoxysilane, N—(N-butyl)-3-aminopropyltriethoxysilane, N—(N-butyl)-1-3-aminopropylalkoxydiethoxysilane or mixtures thereof as well as corresponding compounds having another alkyl group instead of the respective propyl group. Examples of this include vinylalkoxysilane, (N-cyclohexylaminomethyl)methyldiethoxysilane, N-cyclohexylaminomethyl)triethoxysilane, N-phenylaminomethyl)methyldimethoxysilane, N-phenylaminomethyl)-trimethoxysilane.

Epoxy-functional silanes may also be selected from a plurality of compounds. Examples that may be mentioned include: 3-glycidyloxymethyltrimethoxysilane, 3-glycidyloxymethyltriethoxysilane, 3-glycidoxymethyltripropoxysilane, 3-glycidoxymethyltributoxysilane, 2-glycidoxyethyltrimethoxysilane, 2-glycidoxyethyltriethoxysilane, 2-glycidoxyethyltripropoxysilane, 2-glycidoxyethyltributoxysilane, 2-glycidoxyethyltrimethoxysilane, 1-glycidoxyethyltriethoxysilane, 1-glycidoxyethyltripropoxy-silane, 1-glycidoxyethyltributoxysilane, 3-glycidoxypropyltrimethoxysilane, 3-glycidoxypropyltriethoxysilane, 3-glycidoxypropyltripropoxysilane, 3-glycidoxypropyltributoxysilane, 2-glycidoxypropyltrimethoxysilane, 2-glycidoxypropyltriethoxysilane, 2-glycidoxypropyltripropoxysilane, 2-glycidoxypropyltributoxysilane, 1-glycidoxypropyltrimethoxysilane, 1-glycidoxypropyltriethoxysilane, 1-glycidoxypropyltripropoxysilane, 1-glycidoxypropyltributoxysilane, 3-glycidoxybutyltrimethoxysilane, 4-glycidoxybutyltriethoxysilane, 4-glycidoxybutyltripropoxysilane, 4-glycidoxybutyltributoxysilane, 4-glycidoxybutyltrimethoxysilane, 3-glycidoxybutyltriethoxysilane, 3-glycidoxybutyltripropoxysilane, 3-propoxybutyltributoxysilane, 4-glycidoxybutyltrimethoxysilane, 4-glycidoxybutyltriethoxysilane, 4-glycidoxybutyltripropoxysilane, 1-glycidoxybutyltrimethoxysilane, 1-glycidoxybutyltriethoxysilane, 1-glycidoxybutyltripropoxysilane, 1-glycidoxybutyltributoxysilane, (3,4-epoxycyclohexyl)methyltrimethoxysilane, (3,4-epoxycyclohexyl)methyltriethoxysilane, (3,4-epoxycyclohexyl)methyltripropoxysilane, (3,4-epoxycyclohexyl)methyltributoxysilane, (3,4-epoxycyclohexyl)ethyltrimethoxysilane, (3,4-epoxycyclohexyl)ethyltriethoxysilane, (3,4-epoxycyclohexyl)ethyltripropoxysilane, (3,4-epoxycyclohexyl)ethyltributoxysilane, (3,4-epoxycyclohexyl)propyltrimethoxysilane, (3,4-epoxycyclohexyl)propyltriethoxysilane, (3,4-epoxycyclohexyl)propyltripropoxysilane, (3,4-epoxycyclohexyl)propyltributoxysilane, (3,4-epoxycyclohexyl)butyltrimethoxysilane, (3,4-epoxycyclohexyl)butyltriethoxysilane, (3,4-epoxycyclohexyl)butyltripropoxysilane, (3,4-epoxycyclohexyl)butyltributoxysilane. Instead of or together with the aforementioned trialkoxysilanes, the corresponding alkyldialkoxysilanes may also be used. In addition, condensates or cocondensates of the aforementioned aminosilanes may also be used as the adhesion promoter compound. The condensates or cocondensates may also be used as partial hydrolyzates. Examples here include DYNASYLAN™ 1146 and 1148 or the cocondensates disclosed in the documents EP 518057 A1, EP 814110 A1 and DE 10212523 A.

The aforementioned adhesion promoters are preferably used in the binder composition in amounts between 0.1 and 10 wt %, preferably between 0.5 and 5 wt %, especially preferably between 0.5 and 2 wt %.

However, so-called tackifiers such as hydrocarbon resins, phenolic resins, terpene-phenol resins, resorcinol resins or derivatives thereof, modified or unmodified resinic acids and/or esters (abietic acid derivatives), polyamines, polyaminoamides, anhydrides and anhydride-containing copolymers are also suitable as adhesion promoters. Addition of polyethoxy resins in small amounts may also improve adhesion with many substrates. Solid epoxy resins having a molecular weight of more than 700 are preferably the used in finely ground form. If tackifiers are used as adhesion promoters, the type and amount will depend on the adhesive/sealant composition as well as the substrate to which it is applied. Typical tackifying resins (tackifiers), e.g. terpene-phenol resins or resinic acid derivatives are used in concentrations between 5 wt % and 20 wt %; typical adhesion promoters such as polyamines, polyaminoamides or phenolic resins or resorcinol derivatives are used in the range between 0.1 and 10 wt %.

All known compounds capable of catalyzing hydrolytic cleavage of the hydrolyzable groups of the silane grouping as well as the subsequent condensation of the Si—OH group to form siloxane groupings (crosslinking reaction and/or adhesion promoter function) may be used as catalysts. Examples include titanates such as tetrabutyl titanate and tetrapropyl titanate; tin carboxylates such as dibutyltin dilaurate, dibutyltin diacetate, dibutyltin diethyl hexanoate, dibutyltin dioctoate, dibutyltindimethyl maleate, dibutyltin diethyl maleate, dibutyltin dibutyl maleate, dibutyltin diisooctyl maleate, dibutyltin ditridecyl maleate, dibutyltin dibenzyl maleate, dibutyltin maleate, dibutyltin diacetate, tin octaoate, dioctyltin distearate, dioctyltin dilaurate, dioctyltin diethyl maleate, dioctyltin diisooctyl maleate, dioctyltin diacetate and tin naphthenoate; tin alkoxides such as dibutyltin dimethoxide, dibutyltin diphenoxide and dibutyltin diisopropoxide; tin oxides such as dibutyltin oxide and dioctyltin oxide; reaction products between dibutyltin oxides and phthalic acid esters, dibutyltin bisacetylacetonate; organoaluminum compounds such as aluminum trisacetylacetonate, aluminum trisethylacetoacetate and diisopropoxyaluminum ethylacetoacetate; chelate compounds such as zirconium tetraacetylacetonate and titanium tetraacetylacetonate; lead octanoate; amine compounds or salts thereof with carboxylic acids such as butylamine, octylamine, laurylamine, dibutylamines, monoethanolamines, diethanolamines, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo-(5,4,0)-undecene-7 (DBU), a low-molecular polyamide resin obtained from an excess of a polyamine and a polybasic acid, adducts of a polyamine in excess with an epoxide, silane adhesion promoters with amino groups such as 3-aminopropyltrimethoxysilane and N-(β-aminoethyl)aminopropylmethyldimethoxysilane.

The fillers may be selected from a plurality of materials, which are to be mentioned here in particular: chalks, natural or ground calcium carbonates, calcium magnesium carbonates, silicates, talc, heavy spar and carbon black. It may optionally be expedient for at least a portion of the fillers to be surface pretreated; with the various calcium carbonates and/or chalks in particular, a coating with stearic acid has proven to be expedient to reduce the water input and to reduce the water sensitivity of the hardened composition. The total filler content in the formulation may vary between 0 and 60 wt %, the preferred range being between 30 and 60 wt %.

Conventional stabilizers or antiaging agents may be used against thermal, thermooxidative or ozone degradation of the inventive compositions, including, for example, sterically hindered phenols (e.g. 2,2-methylene-bis-(4-methyl-6-tert-butylphenol)) and/or thioethers and/or substituted benzotriazoles or the sterically hindered amines of the HALS type (hindered amine light stabilizers), typical quantity ranges for these stabilizers being from 0 to 2.5 wt %.

Although the rheology of the inventive compositions can also be brought into the desired range through the choice of fillers and the quantity ratio of prepolymers, conventional rheology aids, e.g. pyrogenic silicas, bentonites or fibrillated or pulp short fibers or hydrogenated castor oil derivatives are known, e.g. by the brand names Rilanit (Cognis) and may be used in the range between 0.1 and 7 wt %, preferably between 1 and 3 wt %. In addition, other conventional additives and auxiliary agents may be used in the inventive compositions, e.g. pigments such as titanium dioxide, carbon black, iron oxides or other inorganic colored pigments.

Typical inventive adhesive/sealant compositions contain:
5 to 30 wt % of a branched polypropylene glycol with methyldialkoxysilyl groups,
5 to 30 wt % of a linear polypropylene glycol with methyldialkoxysilyl groups,
1 to 10 wt % of an amorphous poly-$\alpha$-olefin, polyisobutylene or a modified polyolefin wax with methyldialkoxysilyl groups and/or trialkoxysilyl groups,
1 to 15 wt % of a paraffinic, naphthenic and/or aromatic petroleum oil,
0.1 to 5 wt % of one or more adhesion promoters,
0 to 60 wt %, preferably 30 to 60 wt % of one or more fillers,
0 to 2 wt %, preferably 0.05 to 1.5 wt % of a catalyst,
whereby the sum of the components yields 100 wt %.

The inventive compositions may be prepared in mixing equipment having a high shearing action in a known way, including, e.g. kneaders, planetary mixers, planetary dissolvers, internal mixers, so-called Banbury mixers, twin-screw extruders and similar mixing equipment with which those skilled in the art are familiar.

The inventive compositions are suitable for use as monocomponent, water-hardening, elastic adhesives/sealants or coating substances which have a very good adhesion to plastic substrates, painted components and plastic coatings without a complex substrate pretreatment and retain this adhesion even after water storage.

In addition, these monocomponent adhesives/sealants may also be made to harden with a second component that contains water.

In the following exemplary embodiments, the invention will be explained in greater detail but the selection of examples should not constitute a restriction on the scope of the inventive subject.

EXAMPLES

The inventive compositions listed in Table 1 below were mixed in a vacuum in an evacuable planetary mixer until they were homogeneous. Unless otherwise indicated, all parts in the examples are given as parts by weight.

For adhesion testing, adhesive beads were applied to various substrates and then allowed to harden for 7 days in a standard climate (23° C./50% relative atmospheric humidity) and then subjected to a peel test. In addition, hardened beads were tested for adhesion after the condensation water test. The condensation water test ("SW") includes 7 days of storage at 40° C. and 98% relative atmospheric humidity, followed by 1 day of storage in a standard climate ("NC"). Another aging test was performed according to the so-called "cataplasm test" ("CP") in accordance with DIN-EN 29142.

In the peel test, the adhesion was graded as follows:
1. Adhesion okay, greater than 95% cohesive fracture,
2. Adhesion still okay, 95% to greater than 75% cohesive fracture,
3. Adhesion not okay, 75% to greater than 25% cohesive fracture,
4. Adhesion not okay, less than 25% cohesive fracture.

To be able to compare the entire adhesion spectrum on different substrates, the individual adhesion grades were added up. The lower this total sum, the wider is the adhesion spectrum of the composition.

Table 2 shows the good mechanical values of the hardened compositions of the inventive Examples 1 to 5.

As shown by the adhesion tests in Tables 3, 4 and 5, the adhesion behavior of the inventive compositions (Examples 1 to 5) is significantly better than with comparable adhesives based on silane-functional polyoxyalkylene prepolymers of the known state of the art, in particular after storage in humidity and/or after the cataplasm test.

TABLE 1

Examples 1 to 5 (inventive)

| Example | 1 | 2 | 3 | 4 | 5 |
|---|---|---|---|---|---|
| Silane-functional polyoxyalkylene prepolymer[1] | 14.000 | 14.000 | 14.000 | 14.000 | 14.000 |
| Silane-functional polyoxyalkylene prepolymer[2] | 10.000 | 14.500 | 14.500 | 14.500 | 14.500 |
| Silane-functional polyolefin[3] | 6.794 | 1.290 | 2.580 | 3.870 | 4.859 |
| Apolar plasticizer/extender oil[4] | 9.006 | 1.710 | 3.420 | 5.130 | 6.441 |
| Antioxidant solution in alkyl sulfonate ester plasticizer | 1.200 | 1.200 | 1.200 | 1.200 | 1.200 |
| Chalk, ground, coated[5] | 47.000 | 47.000 | 47.000 | 47.000 | 47.000 |
| Thixotropy agent, Rilanit | 2.000 | 2.000 | 2.000 | 2.000 | 2.000 |
| Titanium dioxide, rutile type | 6.200 | 6.200 | 6.200 | 6.200 | 6.200 |
| DINP[6] | 0.000 | 8.300 | 5.300 | 2.300 | 0.000 |
| 3-Glycidoxypropyltrimethoxysilane | 0.500 | 0.500 | 0.500 | 0.500 | 0.500 |
| Silane cocondensate | 0.500 | 0.500 | 0.500 | 0.500 | 0.500 |
| Silane AMMO | 2.000 | 2.000 | 2.000 | 2.000 | 2.000 |
| Catalyst solution[7] | 0.800 | 0.800 | 0.800 | 0.800 | 0.800 |
| Total | 100.000 | 100.000 | 100.000 | 100.000 | 100.000 |

Notes
[1] Bis[3-(methyldimethoxysilyl)propyl]polyoxypropylene, functionality >2
[2] Bis[3-(methyldimethoxysilyl)propyl]polyoxypropylene, functionality approx. 2
[3] Poly-$\alpha$-olefin with methyldialkoxysilyl groups or trialkoxysilyl groups
[4] Paraffinic petroleum oil of $C_{18}$-$C_{21}$ alkanes
[5] Average particle size 5 μm
[6] Solution of dibutyltin dibutylate (58.3 parts), dioctyl phthalate (34.7 parts), toluylsulfonyl isocyanate (6.9 parts) and alkyl sulfonate ester of phenol (40 parts)

TABLE 2

Mechanical values of the hardened compositions

| Example | 1 | 2 | 3 | 4 | 5 |
|---|---|---|---|---|---|
| Skin-forming time (min) | 6 | 15 | 20 | 20 | 15 |
| Shore A hardness after | | | | | |
| 1 day NC | 12 | 16 | 17 | 17 | 19 |
| 7 days NC | 39 | 39 | 42 | 45 | 46 |
| Thorough hardening of bead after | | | | | |
| 1 day standard climate (mm) | 1.8 | 2.4 | 2.3 | 2.3 | 2.2 |
| Tensile test[1] | | | | | |
| 10% modulus N/mm$^2$ 1 day NC | 0.080 | 0.150 | 0.120 | 0.130 | 0.140 |
| 25% modulus N/mm$^2$ 1 day NC | 0.240 | 0.310 | 0.290 | 0.290 | 0.300 |
| 50% modulus N/mm$^2$ 1 day NC | 0.440 | 0.480 | 0.500 | 0.510 | 0.510 |
| 100% modulus N/mm$^2$ 1 day NC | 0.590 | 0.620 | 0.660 | 0.680 | 0.670 |
| Tensile strength N/mm$^2$ 1 day NC | 0.700 | 0.720 | 0.840 | 0.850 | 0.780 |
| Elongation % 1 day NC | 193 | 169 | 210 | 196 | 159 |
| Tensile test[1] | | | | | |
| 10% modulus N/mm$^2$ 7 days NC | 0.120 | 0.060 | 0.110 | 0.180 | 0.150 |
| 25% modulus N/mm$^2$ 7 days NC | 0.320 | 0.220 | 0.320 | 0.370 | 0.380 |
| 50% modulus N/mm$^2$ 7 days NC | 0.540 | 0.390 | 0.560 | 0.600 | 0.640 |
| 100% modulus N/mm$^2$ 7 days NC | 0.700 | 0.710 | 0.800 | 0.840 | 0.850 |
| Tensile strength N/mm$^2$ 7 days NC | 0.780 | 0.920 | 0.930 | 0.990 | 1.000 |
| Elongation % 7 day NC | 164 | 210 | 165 | 183 | 184 |

[1] According to DIN 53504 on S2 rods

TABLE 3

Bead adhesions

| | Example 1 | | Comparative Example 1 (commercial product) | | Comparative Example 2 (commercial product) | |
|---|---|---|---|---|---|---|
| Substrate | NC | SW | NC | SW | NC | SW |
| ABS | 1 | 1 | 1 | 2 | 1 | 1 |
| Soft PVC | 1 | 1 | 4 | 4 | 1 | 1 |
| Powder enamel SW 262 D (Akzo Nobel) | 1 | 1 | 1 | 4 | 4 | 4 |
| Powder enamel SW 206 D (Akzo Nobel) | 1 | 1 | 1 | 4 | 3 | 4 |
| Powder enamel with effect pigment | 1 | 1 | 1 | 4 | 4 | 4 |
| Polystyrene | 1 | 1 | 1 | 1 | 1 | 1 |
| | 6 | 6 | 9 | 19 | 6 | 15 |

NC = 7 days 23° C./50% rh (relative humidity)
SW = 7 days 23° C./50% rh + 7 days 40° C./98% rh + 1 day 23° C./50% rh

TABLE 4

Cataplasm test in accordance with DIN-EN 29142

| | Bead adhesion | | | |
|---|---|---|---|---|
| | Example 1 | | Comparative Example 3 (commercial product) | |
| Substrate | NC | CP | NC | CP |
| Al elox E 6 EV 1 | 1 | 1 | 1 | 4 |
| Steel plate, crude | 1 | 1 | 1 | 3 |
| Steel plate, hot-dip galvanized | 1 | 1 | 1 | 4 |
| Steel plate, electro-galvanized | 1 | 1 | 3 | 4 |
| V2A 4301 | 1 | 1 | 1 | 4 |
| Aluminum 99.5 | 1 | 1 | 1 | 4 |
| Hard PVC | 1 | 1 | 1 | 2 |
| Glass fiber-reinforced plastic | 1 | 3 | 2 | 4 |
| Glass | 1 | 1 | 1 | 3 |
| Total | 9 | 11 | 12 | 32 |

NC storage = 7 days

CP storage = 7 days NC + cataplasm (7 days 70° C., 1 day −20° C., 1 day NC)

NC = 7 days 23° C./50% rh

SW = 7 days 23° C./50% rh + 7 days 70° C./100% rh + 1 day −20° C. + 1 day 23° C./50% rh

TABLE 5

Adhesion test

| | Example 1 | | Example 2 | | Example 3 | | Example 4 | | Example 5 | |
|---|---|---|---|---|---|---|---|---|---|---|
| Substrate | NC | SW | NC | SW | NC | SW | NC | SW | NC | SW |
| Al Mg Si 0.5 | 4 | 1 | 4 | 1 | 4 | 1 | 4 | 1 | 4 | 1 |
| Al Mg Si 1 | 1 | 1 | 1 | 1 | 1 | 1 | 1 | 1 | 1 | 1 |
| Al Mg 3 | 1 | 1 | 1 | 1 | 1 | 1 | 1 | 1 | 1 | 1 |
| Al Mg 4.5 Mn | 1 | 1 | 1 |   | 1 | 1 | 1 | 1 | 1 | 1 |
| Al Cu Mg 1 | 1 | 1 | 1 | 1 | 1 | 1 | 1 | 1 | 1 | 1 |
| Al Zn Mg Cu 1.5 | 1 | 1 | 1 | 1 | 1 |   | 1 | 1 | 1 | 1 |
| Al elox E 6 EV 1 | 1 | 1 | 1 | 1 |   |   | 1 | 1 | 1 | 1 |
| Copper SF Cu hh | 1 | 1 | 1 | 1 | 1 | 1 | 1 | 1 | 1 | 1 |
| Brass MS/58, polished | 1 | 1 | 1 | 1 | 1 | 1 | 1 | 1 | 1 | 1 |
| Steel plate, crude 1203 | 1 | 1 | 1 | 1 | 1 | 1 | 1 | 1 | 1 | 1 |
| Steel plate, hot-dip galvanized | 1 | 1 | 1 | 1 | 1 | 1 | 1 | 1 | 1 | 1 |
| Steel plate, electro-galvanized | 1 | 1 | 1 | 1 | 1 | 1 | 1 | 1 | 1 | 1 |
| V2A 4301 | 1 | 1 | 1 | 1 | 1 | 1 | 1 | 1 | 1 | 1 |
| Aluminum 99.5 | 1 | 1 | 1 | 1 | 1 | 1 | 1 | 1 | 1 | 1 |
| SUBTOTAL | 17 | 14 | 17 | 13 | 17 | 13 | 17 | 13 | 17 | 13 |
| PA 6.6 natural, Röschling | 1 | 1 | 1 | 1 | 1 | 1 | 1 | 1 | 1 | 1 |
| Makrolon, Bayer | 1 | 1 | 1 | 1 | 1 | 1 | 1 | 1 | 1 | 1 |
| Polystyrene. Metzeler | 1 | 1 |   |   |   |   |   |   |   |   |
| Hard PVC gray, Simona |   |   | 1 | 1 | 1 | 1 | 1 | 1 | 1 | 1 |
| Epoxy resin glass fibers | 1 | 1 | 1 | 1 | 1 | 1 | 1 | 1 | 1 | 1 |
| Glass | 1 | 1 | 1 | 1 | 1 | 1 | 1 | 1 | 1 | 1 |
| SUBTOTAL | 5 | 5 | 5 | 5 | 5 | 5 | 5 | 5 | 5 | 5 |
| TOTAL | 22 | 19 | 22 | 18 | 22 | 18 | 22 | 18 | 22 | 18 |

NC storage = 7 days
SW storage = 7 days NC + 7 days SW

The invention claimed is:

1. A monocomponent, water-hardening adhesive and/or sealant composition consisting of:
   (a) 5 to 30%, by weight, of a branched polypropylene glycol with at least one methyldialkoxysilyl group;
   (b) 5 to 30%, by weight, of a linear polypropylene glycol with at least one methyldialkoxysilyl group;
   (c) 1 to 10%, by weight, of an amorphous poly-α-olefin with at least one methyldialkoxysilyl group and/or trialkoxysilyl group;
   (d) 1 to 15%, by weight, of a paraffinic, naphthenic and/or aromatic petroleum oil;
   (e) 0.1 to 5%, by weight, of an adhesive promoter;
   (f) 0 to 60%, by weight, of a filler; and
   (g) 0 to 2%, by weight, of a catalyst,
in which the sum of the components is 100%.

2. The monocomponent, water-hardening adhesive and/or sealant composition of claim 1, wherein the filler is present in an amount of 30 to 60% by weight and the catalyst is present in an amount of 0.05 to 1.5% by weight.

3. An article comprising the monocomponent, water-hardening adhesive and/or sealant composition of claim 2.

4. A process for bonding or coating a substrate comprising:
   a) applying the monocomponent, water-hardening adhesive and/or sealant composition of claim 1 onto a substrate and
   b) curing the said composition.

5. The process for bonding or coating a substrate according to claim 4, wherein the substrate is a plastic or pre-painted substrate.

6. The process for bonding or coating a substrate according to claim 5, wherein the substrate has not been pretreated.

* * * * *